Feb. 14, 1961 L. HENZIROHS 2,971,550
JUICE EXTRACTOR
Filed Dec. 10, 1957

Inventor:
Leo Henzirohs
by:
Michael S. Strike,
Attorney

United States Patent Office 2,971,550
Patented Feb. 14, 1961

2,971,550

JUICE EXTRACTOR

Leo Henzirohs, Oberbuchsiten, Switzerland, assignor to Jura Elektroapparate-Fabriken L. Henzirohs A.G., Niederbuchsiten, Switzerland Filed Dec. 10, 1957, Ser. No. 701,806

Claims priority, application Switzerland Nov. 11, 1957

4 Claims. (Cl. 146—76)

My present invention relates to improvements in juice extractors comprising a feeding tube and a rotor having a bottom which is provided with shredding teeth below the space surrounded by the feeding tube.

Juice extractors of this type are in wide use. Practice has shown that if they are used to finely shred stems of rhubarbs or other fruits having a fibrous structure, the juice-containing pulp is well detached from the fibers by the shredding teeth, but the fibers are not cut away, clog the machine very quickly and render it inoperative.

The present invention aims to remedy this drawback by providing the feeding tube with a jagged lower end and by providing the rotor bottom with supplemental teeth running at close proximity of said jagged end.

Further objects and features will appear from the following description of an embodiment of the invention represented by way of example in the accompanying drawings in which.

Figure 1:
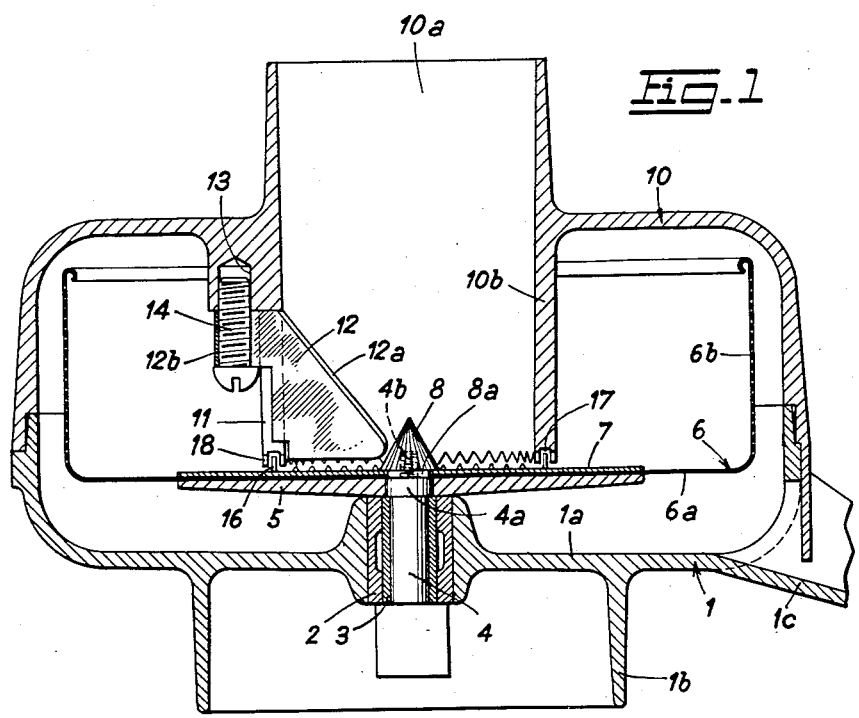
Fig. 1 is a vertical section of said embodiment.
Figure 2:
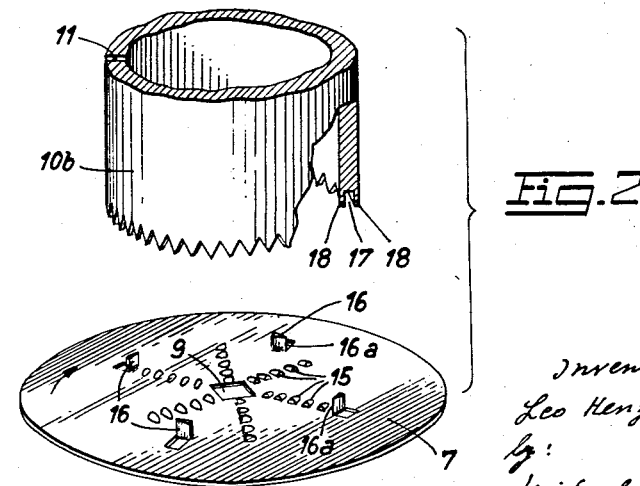
Fig. 2 is an exploded perspective view of the lower end portion of the feeding tube and of a cutting disc which constitutes one of the parts of the rotor.

I have not shown in the drawings a base in which is incorporated an electric driving motor and on which a lower casing part 1 can be fitted, in a manner well known in the art, by means of a flange 1b extending downwardly from a bottom portion 1a. The latter has a central bore fitted in usual manner with sleeve-like parts 2, 3 of a bearing in which a short axle 4 can rotate but not move in its axial direction. This axle has a lower end portion which fits in driving connection with a complementary upper end portion of the motor shaft when the casing part 1 is set onto the above-mentioned base.

A disc 5 made of brass, for example, is fitted on a collar 4a of the axle 4. A flat bottom 6a of a centrifuge basket 6 is soldered to the upper surface of the disc 5. The peripheral wall 6b of the basket 6 is perforated as usual and acts as a strainer. The bottom 6a of the basket supports a comminuting member in the form of a cutting disc 7 which has a central square hole 9. A cap nut 8 screwed onto an upper threaded end portion 4b of the axle 4 has a square base portion 8a which fits snugly in the hole 9. Thus a user may loosen and lock the nut 8 by retaining against rotation the basket 6 with his one hand and by applying at the same time a torque on the cutting disc 7 with his other hand (it being supposed that an upper casing part 10 described below has been removed). When the nut 8 is removed, the parts 5, 6 and 7 may be retracted upwardly for cleaning purposes.

The nut portion above the base portion 8a has a generally conical configuration, but the conical surface has cuttings ribs extending each in a radial plane.

The lower casing part 1 has a juice spout 1c. It supports and centers an upper removable cap-shaped casing part 10 on which is formed a second comminuting member in the form of a cylindrical feeding tube 10a, 10b the axis of which coincides with the vertical axis of rotation of the rotor constituted by the parts 4—8. The lower portion 10b of the feeding has a radial longitudinal slot 11 in which is held a steel blade 12 provided with a collar 12b. A screw 14 extending through this collar and engaging threads of a hole 13 secures the blade 12 to the casing part 10. The blade 12 has a knife edge 12a sloping from the wall of the feeding tube towards the cap nut 8; its purpose consists in preventing a rotation of the fruits and vegetables fed into the tube 10a, 10b and pressed onto the cutting disc 7.

The cutting disc 7 has formed on its upper surface the usual radial rows of shredding teeth 15 located below the space surrounded by the feeding tube 10a, 10b. According to the present invention it has furthermore supplemental teeth 16. In the example shown in the drawings, there are four such teeth 16 angularly spaced by 90° and constituted each by a rectangular portion of disc material cut out on three sides and bent over by 90° on the fourth, circumferentially extending side; each such tooth 16 has a sharp forward edge 16a extending at a right angle to the plane of the disc 7. The lower end surface of the feeding tube 10a, 10b has a circumferential groove 17 in which these teeth 16 run when the machine is operating. Both side walls 18 of the groove 17 are jagged over their whole circumference and constitute a toothed annulus whose axis coincides with the axis of the comminuting member 10a, 10b. If seen in radial direction the path of the teeth 16 overlaps the teeth and indentations of the walls 18.

The number of the teeth 16 might be smaller or greater than four. The jagged profile of the walls 18 might be modified in several manners. The cutting edges 16a need not extend parallel to the axis of rotation of the rotor; they might be straight but inclined or, in a further modification, be curved to act like a curved sword.

During operation of the juice extractor the supplemental teeth 16 cooperate with the jagged walls 18 to cut into very small particles such parts which have been shred off by the shredding teeth 15 and thrown radially outwardly by centrifugal forces through the passage defined by the comminuting members 7 and 10a, 10b. The teeth 16 are particularly effective in cutting also into small pieces the tough fibers which make up an important portion of the structure of rhubarb and some other fruits and vegetables, and thereby impede a clogging of the machine by such fibers.

The improvement provided by my invention can also be used with much profit in juice extractors in which the strainer of the rotor is not cylindrical as shown and described hereabove, but flares in order to allow for a continuous removal of the spent pulp in a manner known per se in the art.

What I claim is:

1. In an apparatus for comminuting food having a fibrous structure to extract juice therefrom and to shred the fibers thereof, in combination, a feeding tube having an axis; a rotor coaxial with said feeding tube, said feeding tube having at one of its ends a coaxial toothed annulus formed with an annular groove, said annulus being located closely adjacent to but spaced from said rotor, and said rotor having at least one tooth extending into the groove of said toothed annulus, said toothed annulus and said rotor defining an annular passage through which the food must move during operation of the apparatus; and means operatively connected to said rotor for rotating the same about said axis.

2. In an apparatus as recited in claim 1, said rotor having a plurality of teeth extending into the groove of said toothed annulus.

3. In an apparatus as recited in claim 2, said teeth being of wedge-shaped configuration and having pointed leading ends, respectively.

4. In an apparatus as recited in claim 1, said feeding tube having a wall whose thickness in the region of said one end thereof is substantially the same as at said one end.

References Cited in the file of this patent

UNITED STATES PATENTS

| | | |
|---|---|---|
| 490,817 | De Vasson | Jan. 31, 1893 |
| 528,735 | Naylor | Nov. 6, 1894 |
| 2,273,093 | Drachenberg | Feb. 17, 1942 |
| 2,297,880 | Fredrickson | Oct. 6, 1942 |
| 2,478,893 | Brant | Aug. 16, 1949 |
| 2,799,313 | Schwarz | July 16, 1957 |
| 2,840,130 | Schwarz | June 24, 1958 |

FOREIGN PATENTS

| | | |
|---|---|---|
| 146,499 | Sweden | Aug. 17, 1954 |